United States Patent [19]
Holm et al.

[11] Patent Number: 6,160,086
[45] Date of Patent: Dec. 12, 2000

[54] PROCESS FOR REMOVING IMPURITIES FROM POLYMERS

[75] Inventors: David R. Holm, Hudson, Wis.; Daniel T. Chen, St. Paul, Minn.; Robert S. Davidson, Edina, Minn.; Eugene E. Harkins, Vadnais Heights, Minn.

[73] Assignee: 3M Innovative Properties Company, St. Paul, Minn.

[21] Appl. No.: 09/126,070

[22] Filed: Jul. 30, 1998

[51] Int. Cl.[7] .................................... C08F 6/06
[52] U.S. Cl. .................. 528/491; 528/492; 528/496; 528/502 R; 264/211.14; 264/211.16
[58] Field of Search ................ 528/491, 502 R, 528/501; 264/211.14, 211.16; 526/492, 496

[56] References Cited

U.S. PATENT DOCUMENTS

| | | | |
|---|---|---|---|
| Re. 24,906 | 12/1960 | Ulrich | 206/59 |
| Re. 28,937 | 8/1976 | Wagner et al. | 260/78 L |
| 2,509,279 | 5/1950 | Sisson | 117/7 |
| 3,030,341 | 4/1962 | Willard | 260/78.4 |
| 3,378,542 | 4/1968 | O'Boyle | 260/210 |
| 3,397,179 | 8/1968 | Roth | 260/47 |
| 3,666,719 | 5/1972 | Morgenstern et al. | 260/47 X |
| 3,755,285 | 8/1973 | Piazza | 260/94.9 |
| 3,799,234 | 3/1974 | Skidmore | 159/2 E |
| 4,237,265 | 12/1980 | Eliassen et al. | 528/496 |
| 4,294,652 | 10/1981 | Newman | 159/2 R |
| 4,360,662 | 11/1982 | Williams | 528/499 |
| 4,413,110 | 11/1983 | Kavesh et al. | 526/348.1 |
| 4,659,755 | 4/1987 | Asanuma et al. | 523/303 |
| 4,737,577 | 4/1988 | Brown | 528/501 |
| 4,751,087 | 6/1988 | Wick | 424/449 |
| 4,771,616 | 9/1988 | Sun et al. | 68/181 |
| 4,795,802 | 1/1989 | Nuber et al. | 528/482 |
| 4,810,775 | 3/1989 | Bendix et al. | 528/480 |
| 4,871,460 | 10/1989 | Robin et al. | 210/634 |
| 4,918,220 | 4/1990 | Collas et al. | 560/352 |
| 5,019,316 | 5/1991 | Ueda et al. | 264/180 X |
| 5,237,048 | 8/1993 | Miyakawa et al. | 528/483 |
| 5,242,594 | 9/1993 | Weinmann et al. | 210/634 |
| 5,292,660 | 3/1994 | Overbeek et al. | 435/262 |
| 5,376,697 | 12/1994 | Johnston et al. | 523/175 |
| 5,436,061 | 7/1995 | Hanneman et al. | 427/208.4 |
| 5,459,168 | 10/1995 | Nasr et al. | 521/49.8 |
| 5,597,891 | 1/1997 | Nelson et al. | 528/481 |
| 5,623,042 | 4/1997 | Wilbourn et al. | 528/486 |
| 5,644,007 | 7/1997 | Davidson et al. | 526/64 |
| 5,684,125 | 11/1997 | Nooren | 528/483 |
| 5,708,133 | 1/1998 | Higuchi et al. | 528/501 X |
| 5,789,522 | 8/1998 | Zampini et al. | 528/129 |
| 5,804,676 | 9/1998 | Hieda et al. | 528/501 X |

FOREIGN PATENT DOCUMENTS

| | | |
|---|---|---|
| 67821 | 6/1997 | Australia . |
| 792672 | 3/1997 | European Pat. Off. . |
| 838 318 | 4/1998 | European Pat. Off. . |
| 2 746 403 | 9/1997 | France . |
| 127328 | 9/1977 | Germany . |
| 157339 | 11/1982 | Germany . |
| 33 23 940 | 1/1985 | Germany . |
| 196 24 299 | 1/1997 | Germany . |
| 52-053999 | 4/1977 | Japan . |
| 61-215708 | 9/1986 | Japan . |
| 62-140601 | 6/1987 | Japan . |
| 62-212463 | 9/1987 | Japan . |
| 1269 474 | 4/1972 | United Kingdom . |
| 2242434 | 2/1991 | United Kingdom . |

*Primary Examiner*—Fred Teskin
*Attorney, Agent, or Firm*—Douglas B. Little

[57] ABSTRACT

A continuous, preferably counter-current, extraction process that can be used to significantly reduce the concentrations of residual monomers, residual catalyst, undesired solvents, and other impurities in polymer compositions. The invention is particularly beneficial for extracting residual monomers and other impurities from viscous, sticky polymer solutions, such as solutions of PSAs and low cohesive strength polymer compositions that phase change during extraction (i.e., change from liquid to solid, or precipitate), in a continuous manner. The polymer composition can be extruded into an extraction solvent as fibers in a vertical extraction column, under conditions such that at least a portion of an impurity is extracted from the polymer into the extraction solvent.

18 Claims, 2 Drawing Sheets

PROCESS FOR REMOVING IMPURITIES FROM POLYMERS

FIELD OF THE INVENTION

This invention relates to methods and systems for removing impurities from polymer compositions. More specifically, this invention relates to using extraction techniques to remove impurities from polymer compositions that may be tacky and highly viscous on one hand, and/or that may have low cohesive strength on the other hand.

BACKGROUND OF THE INVENTION

There is a growing demand for polymer materials that contain less impurities, particularly in the electronic and medical industries. While there are various methods for purifying certain kinds of polymer materials, there is still a need for an economical and versatile method to purify tacky and/or low cohesive strength polymer compositions. Tacky polymer compositions are often useful in pressure-sensitive adhesive compositions. Low-cohesive polymer compositions include extrudable materials that may be tacky or non-tacky.

Tacky, pressure sensitive adhesive (PSA) compositions are well known in the industry. Representative PSA polymers include (meth)acrylate copolymers, polyalphaolefin polymers, silanes, rubbers, block copolymers, and the like. Some PSA compositions have been described in U.S. Pat. Nos. 5,644,007; 4,751,087; 4,737,577; and Re. (Reissue) 24,906; all of which are incorporated herein by reference.

PSA polymers are made by polymerization reactions in which the reaction product may comprise residual monomer, low molecular weight (e.g. weight average molecular weight of 1000 or less) oligomeric by-products, catalyst, residual crosslinking promoters, and/or other impurities. In today's market, the specifications for PSA polymers are becoming more and more strict to the point where previously acceptable levels of such impurities are no longer tolerated.

DISCLOSURE OF INVENTION

The invention provides a continuous, preferably counter-current, extraction process that can be used to significantly reduce the concentrations of residual monomers, residual catalyst, undesired solvents, and other impurities in polymer compositions. The invention is a versatile processing technique that can be used to remove impurities from a myriad of oligomers, polymers, oligomer solutions, and/or polymer solutions, including thermoplastic materials, thermosetting materials, tacky spinnable materials, materials such as low cohesive strength adhesives and polymers that ordinarily are not spinnable, combinations of these, and the like. The invention is particularly beneficial for extracting residual monomers and other impurities from viscous, sticky polymer solutions, such as solutions of PSAs and low cohesive strength polymer compositions that phase change during extraction (i.e., change from liquid to solid, or precipitate), in a continuous manner. For example, the present invention has been used to reduce the concentrations of residual iso-octyl acrylate (IOA) and acrylamide (ACM) in an adhesive IOA/ACM copolymer to 1/295 and 1/850 of their initial level, respectively.

In a preferred embodiment of the extraction process, a polymer composition to be purified (feed) is extruded through a die whose outlet face is submerged in an extraction solvent that is being pumped counter-currently to the extruded material. The polymer composition preferably is extruded through one aperture or a plurality of apertures so that the extrudate forms one or more extrudate bodies having a large ratio of surface area to unit volume. A typical ratio of surface area to unit volume is in the range 80 mm$^{-1}$ to 0.8 mm$^{-1}$. If a plurality of apertures is used, the extrudate forms a plurality of subdivided units, e.g., fibers, strands, ribbons, beads, or the like. The fibers or strands are high surface area/unit volume structures that greatly reduce the diffusion path required for extraction, thus increasing the extraction efficiency of the process. When the feed includes a solvent in which the polymer(s) to be purified are soluble, the extraction solvent preferably is miscible with the solvent in which the polymer is dissolved but immiscible with the polymer. Under these conditions, the polymer precipitates from solution during the extraction process. The precipitated polymer can be redissolved following the extraction process to provide a purified polymer solution that contains low levels of residual monomers and other impurities.

The invention provides a significant technological advance in that there are no previously disclosed, satisfactory methods for the continuous, counter-current extraction of residual monomers and other impurities from tacky polymer compositions or low-cohesive strength polymer compositions, which in some cases, can undergo a significant increase in viscosity due to a phase change (when precipitating from solution) during the counter-current extraction process.

In other embodiments, the feed composition need not contain a solvent so long as the polymer is tacky or changes phase when it is in the extraction solvent. The phase change is typically from a liquid to a solid resulting when the feed containing the polymer is immersed in the extraction solvent.

The invention is inexpensive to implement (i.e., low capital costs) because it can be carried out using relatively few items of commercially available equipment, including an extraction column, a spinnerette assembly, an adhesive feed pump, a product removal pump, a solvent feed pump, and some pipes or tubes for supplying and withdrawing materials to and from the extraction column. The invention advantageously may be carried out using a linear extraction column containing no plates, packing, or moving parts. Thus, maintenance requirements are minimized, and extremely sticky, viscous polymer solutions (e.g., adhesives) and/or polymer solutions that exhibit a significant increase in viscosity during the extraction step (e.g., when the polymer precipitates from solution) can be purified using the invention.

In one aspect, the present invention relates to a method for removing at least one impurity from such a polymer composition. The polymer composition may be either a tacky composition or a low cohesive strength composition that phase changes in the extraction solvent. The polymer composition is extruded into an extraction solvent. The polymer composition and the extraction solvent are contacted under conditions such that at least a portion of the impurity is extracted from the polymer composition into the extraction solvent.

In another aspect, the present invention relates to a method of removing impurities from a tacky, polymer composition comprising a polymer component and at least one impurity, wherein an extraction solvent is caused to flow through a vertical extraction column from a first end of the extraction column to a second end of the extraction column. A polymer composition is extruded into the extraction solvent through a plurality of orifices proximal to the first end of the extraction column. The extruded polymer composition is caused to form a plurality of fibers that extend along a length of the column from the orifices to the second end, said fibers flowing co-currently with the flow of extraction solvent. After the fibers reach the second end of the column, the extraction solvent is caused to flow counter-currently to the fibers. The counter-currently flowing fibers and extraction solvent are contacted under conditions such that at least a portion of the impurity is extracted from the polymer composition into the extraction solvent.

If the extruded polymer is more dense than the extraction solvent, the first end of the extraction column is the upper end and the second end is the lower end. If the extruded polymer is less dense than the extraction solvent, the first end is the lower end, and the second end is the upper end of the column.

In another aspect, the present invention relates to an extraction apparatus. The apparatus includes a linear, unobstructed, vertical conduit. The vertical conduit includes a first end and a second end. The second end includes a raffinate port, said second end being flared to a cross-sectional area substantially greater than that of the conduit. An extrusion die is positioned at the first end of the conduit. The extrusion die includes a plurality of orifices through which a feed may be extruded into the conduit. A first extraction fluid port is located at the first end of the conduit. A second extraction fluid port is located at the second end of the conduit.

For purposes of describing the positions of parts of the apparatus relative to each other, it is useful to consider the direction in which the extraction solvent is flowing through the extraction column at steady state as the stream direction. Items located further in that direction than other items can be considered as being downstream, and items located in the opposite relative direction may be described as being upstream. The second extraction fluid port is located downstream of the raffinate port.

PSA compositions may comprise desirable oligomeric and/or polymeric components. For purposes of this invention, the terms "polymeric" or "polymer" or the like when used in connection with an adhesive composition shall be deemed to refer collectively to both the desirable oligomeric and polymeric components, but not the undesirable, low molecular weight oligomeric by-products considered to be contaminants.

The term "tacky polymer composition" refers to a composition that tends to stick to itself upon contact to form agglomerates. Such a composition may also stick to surrounding surfaces that the composition contacts.

The term "low-cohesive strength polymer composition" refers to polymer compositions that break apart when mechanically drawn and experience a phase change when immersed in an extraction solvent.

The term "phase change" refers to a dramatic change in viscosity as experienced when a polymer composition changes from a liquid to a solid or at least partially precipitates.

The term "immiscible" with respect to a polymer and an extraction solvent means that solubility of the polymer component in the extraction solvent is so low that at least a portion of the polymer precipitates in the solvent even when only 1 gram of the polymer is combined with 100 grams of the solvent.

The term "miscible" with respect to two solvents means that a mixture of the two solvents forms one phase. The miscibility of two solvents may depend upon a number of factors such as the relative amounts of the solvents being combined, temperature, and the like. Thus, two solvents may be miscible under one set of conditions, but not under another.

DETAILED DESCRIPTION OF THE PRESENTLY PREFERRED EMBODIMENTS

Figure 1:
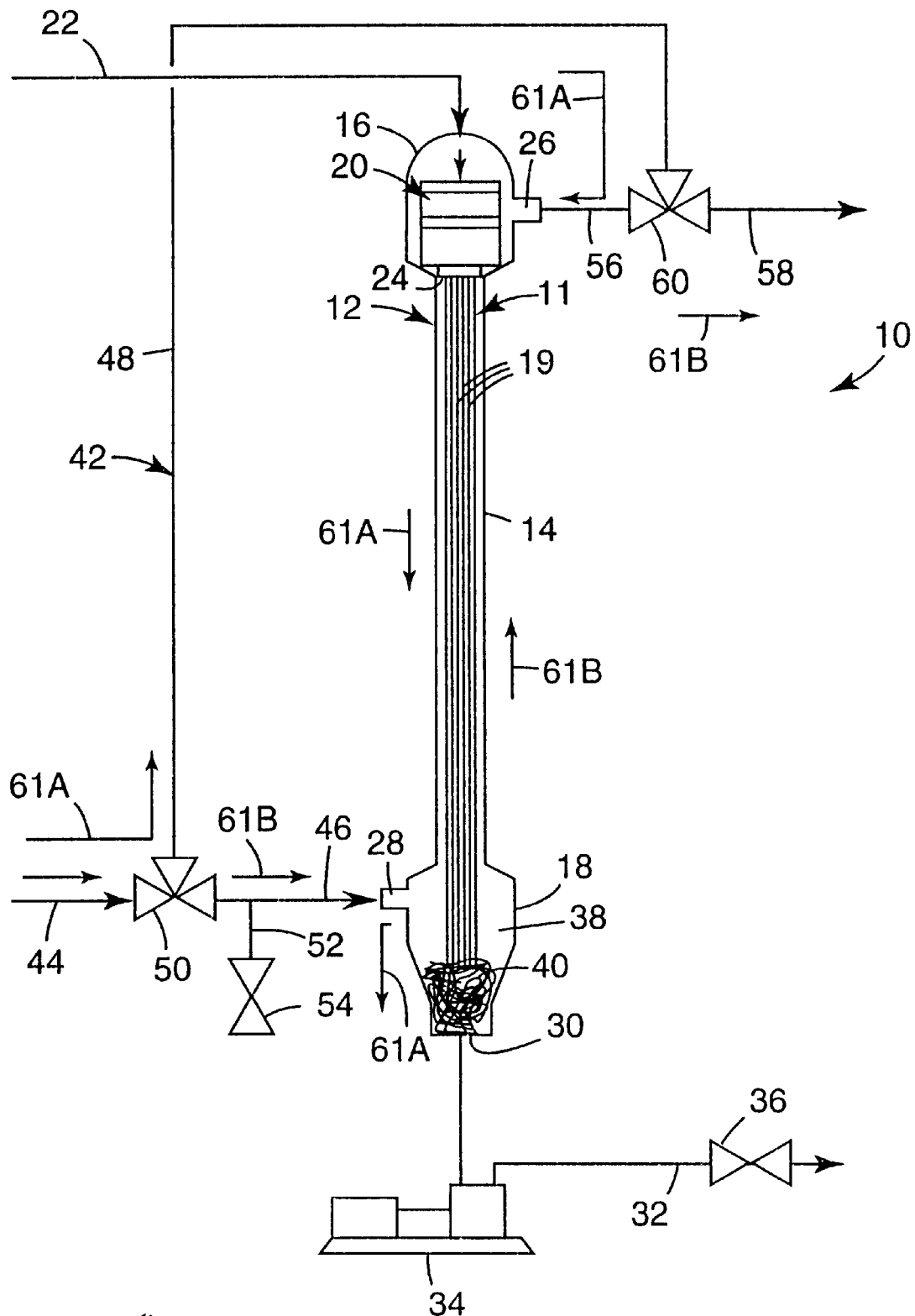
FIG. 1 is a schematic representation of one apparatus for carrying out a preferred extraction process of the present invention.

The embodiments of the present invention described below are not intended to be exhaustive or to limit the invention to the precise forms disclosed in the following detailed description. Rather the embodiments are chosen and described so that others skilled in the art may appreciate and understand the principles and practices of the present invention.

The present invention is a continuous, versatile purifying process particularly suitable for removing impurities from polymer compositions that are either (1) tacky and/or (2) have low cohesive strength and undergo a phase change when immersed in an extraction solvent. In preferred embodiments, removal of impurities is accomplished by a liquid-liquid and/or liquid-solid extraction scheme in which polymer component(s) of a feed stream are converted into a precipitate when contacted with an extraction solvent, subjected to extraction while in contact with the extraction solvent, and then continuously recovered in purified form. Significantly, all this happens within the extraction apparatus 10 of FIG. 1 without the need to rely upon any additional equipment.

This approach provides significant performance advantages. Firstly, tacky polymer compositions and low-cohesive strength, phase-changing polymer compositions can be continuously purified to levels that could not generally be achieved before in an economical manner. The improved degree of purification results, at least in part, because the present invention allows high surface area to unit volume ratios to be generated and maintained, resulting in high extraction efficiencies. Secondly, many kinds of materials can be purified by this method. For example, the inventive process may be used to remove contaminants from a wide variety of polymers, oligomers and solutions thereof, including thermoplastic materials, thermoset materials, tacky spinnable materials, materials such as low-cohesive strength adhesives and low-cohesive strength phase changing polymer compositions that ordinarily are not spinnable, combinations of these, and the like. In particular, any material that is tacky and would otherwise stick to itself or to extraction equipment can be processed. Also, polymer compositions that go through a phase change but have a low cohesive strength can now be more easily purified because they are processed into forms that have a sufficient ratio of surface area per unit volume for efficient extraction. The tacky polymer compositions may or may not be sufficiently cohesive to be drawable. The low-cohesive strength, but phase-changing (not readily drawable), polymer compositions may be tacky or non-tacky. A particularly useful class of tacky polymer compositions are acrylate PSA solutions such as those described in U.S. Pat. Nos. 4,751,087; 4,737,577; and Re 24,906. A particularly useful class of low-cohesive strength, but phase-changing, polymer compositions are tackifiers, such as a hydrogenated base resin polymerized using styrenic-based co-monomers and available as REGALREZ™ 1139 from Hercules Chemical Co., that are dissolved in a suitable solvent such as toluene.

In the practice of the present invention, the polymer composition is often the dispersed phase and the extraction solvent is often the continuous phase as the two phases pass through an extraction column. The two input streams may make contact in a continuous manner that may be either co-current or counter-current. For counter-current flow, the extraction column is comprised of a number of theoretical stages in which the two phases approach equilibrium at each stage. In co-current flow, the extraction column has at most a single theoretical stage. Counter-current extraction, thus, is preferable because such extraction results in a more efficient use of extraction solvent. The process variables that have the most effect upon this separation method are (1) extraction solvent type, (2) weight ratio of extraction solvent to polymeric composition, (3) surface area/unit volume of the dispersed phase, (4) number of theoretical extraction stages (for counter-current flow only), (5) extraction temperature and (6) relative flow velocities of the extraction solvent and the polymer composition. Extraction is further discussed in *Perry's Handbook of Chemical Engineering*, $6^{th}$ ed., 1984, Section 15, incorporated by reference herein.

With these process variables in mind, FIG. 1 schematically shows one embodiment of an apparatus 10 of the present invention particularly suitable for removing at least one contaminant from an adhesive or a low cohesive strength, but phase changing feed composition 11 of the type comprising one or more polymeric components to be purified, e.g., a PSA polymer, and one or more contaminants in the form of residual monomer, reaction by-products, catalyst, crosslinking aid (e.g., photoinitiator), unwanted solvent, unreactive impurity and/or the like. Feed composition 11 may comprise a sufficient amount of a feed solvent, if any, so that composition 11 has a viscosity suitable for extruding into extraction column 12 of apparatus 10. In some embodiments, however, feed composition 11 need not include any solvent at all if the material to be processed is extrudable by itself.

The feed composition 11 preferably is extruded into extraction column 12 through a plurality of apertures to form a plurality of subdivided units in the form of fibers, strands, ribbons, beads, and/or the like; although extrusion may occur through a single aperture so long as the ratio of surface area to unit volume is satisfactory (e.g., star-shaped cross-section). For purposes of illustration, a plurality of flowing fibers 19 are shown. The greater the surface area/unit volume of the dispersed phase, the shorter the height of a theoretical extraction stage, i.e., the greater the efficiency of an extraction stage. Increased mass-transfer efficiencies associated with the higher ratios of surface area to unit volume translate into a shorter overall extraction column for given operating conditions. If the surface area/unit volume ratio is too small, the extraction may be too inefficient, and the extraction column needed for achieving the desired degree of extraction would be too long to be practical. If the surface area/unit volume ratio is too large, the extruded material may become entrained in the extraction solvent and, thus, may be carried out of the extraction column by the extraction solvent along with the extracted impurity, i.e. the column is "flooded".

The extruded feed composition 11 is caused to contact a preferably counter-current flow of an extraction solvent. The extraction solvent may be any solvent, or combination of solvents, suitable for carrying out extraction, but preferably is (1) as immiscible as possible with the polymer to be purified and (2) able to extract the impurities of interest (i.e., result in relatively high partition coefficients of the impurities). Further, if feed composition 11 includes a solvent, it is also preferred that the feed solvent and the extraction solvent are miscible with each other. Such characteristics facilitate the forces that drive the contaminants from the polymer into the extraction solvent. In addition, the extraction solvent preferably is relatively inexpensive and amenable to commercial recovery techniques. A typical extraction solvent for acrylate-based pressure-sensitive adhesives is methanol. A suitable corresponding feed solvent would be 90:10 (on a weight basis) combination of ethyl acetate:methanol.

As a consequence of these preferred criteria, the polymer component of fibers 19 precipitates in the extraction solvent. The fibers may rise or fall depending upon whether the fiber density is greater or less than that of the extraction solvent. Thus, column 10 may be used in an inverted orientation or as depicted depending upon the relative densities of the feed and extraction solvent. Further discussion regarding the details of the process will be for the case as illustrated in which the density of fibers 19 is greater than the density of the extraction solvent such that fibers 19 fall to the bottom of column 12. As the falling fibers 19 flow downward in counter-current relationship to the extraction solvent flowing upward in column 12, the extraction solvent extracts one or more contaminants from fibers 19. The resultant, purified adhesive composition, or raffinate, can then be continuously withdrawn from the bottom of column 12.

Vertical extraction column 12 includes cylindrical middle section 14 extending between flared top end 16 and flared bottom end 18. Middle section 14 preferably has a configuration (e.g., free from edges or imperfections) that allows fibers 19 to flow through middle section 14 without adverse contact with each other or the walls of middle section 14. Such unimpeded flow is particularly desirable when fibers 19 comprise a PSA because, otherwise, fibers 19 could stick to each other or to the column walls, causing apparatus 10 to become plugged. Thus, the path taken by fibers 19 through middle section 14 preferably is linear to facilitate the unimpeded flow of fibers 19. Middle section 14 generally has a circular cross-section that advantageously also facilitates unimpeded flow of fibers 19 through column 12 in that there are no corners, edges, turns, or the like running across or along the length of middle section 14 that might otherwise catch the moving fibers 19 during extraction operations.

The length of middle section 14 should be sufficiently long so as to contain the necessary number of theoretical extraction stages needed to achieve a desired level of extraction. The number of theoretical stages can be increased by using a longer middle section 14. Increasing the number of theoretical extraction stages enables one to use a lower mass flow ratio of extraction solvent to feed composition 11 while still achieving the desired extraction results. Generally, a longer column also enables better extraction results for a given mass flow ratio of extraction solvent to feed composition 11. However, the optimum length of the middle section 14 also depends on a number of factors such as the extraction solvent type, the ratio of extraction solvent to polymer composition, the surface area/unit volume of the polymer structures, the nature of composition 11, the extraction temperature, the solvent and feed flow rates, and the degree of extraction required. With these factors in mind, middle section 14 typically has a length of 1 m to 15 m.

In terms of cross-sectional area, middle section 14 desirably is small enough to ensure that the velocity of extraction solvent is high enough for a given ratio of extraction solvent to adhesive polymer composition 11 to carry out extraction operations at the desired material handling rate of composition 11, but not so high that the flow of extraction solvent would flood apparatus 10 causing fiber entanglement. As one suggested guideline, a cylindrical middle section 14 having an inside diameter in the range of 4 cm to 100 cm is suitable. The extraction apparatus 10 may also be jacketed for use of heat transfer fluids to heat or cool the contents of the apparatus.

Flared or enlarged top end 16 permits use of spinnerette assembly 20 through which feed composition 11 is extruded into column 12 from feed supply conduit 22. Typically, the ratio of the maximum diameter of flared top end 16 to middle section 14 is in the range from about 1.2 to 2, preferably about 2 (for a middle section 14 having a diameter of a few centimeters). The ratio decreases as the diameter of middle section 14 significantly increases. The flare in top end 16 permits the spinnerette assembly 20 to be significantly larger than the diameter of the area encompassing the apertures while still allowing the discharge face 24 of spinnerette assembly 20 to be fully submerged in the extraction solvent. The discharge face 24 can be either flat, typical of spinnerette dies used in the fiber spinning industry, or may contain many protrusions with a single aperture in each protrusion, typical of extrusion dies. If the face of spinnerette assembly 20 is flat and not submerged, the extruded fibers 19 may coalesce together when entering column 12, resulting in poor extraction efficiency and/or plugging of column 12. Flared top end 16 also includes top port 26 through which extraction solvent can be pumped into, or withdrawn from, the top of extraction column 12.

Flared or enlarged bottom end 18 includes solvent port 28 through which extraction solvent can be pumped into, or withdrawn from, the bottom of extraction column 12. Below solvent port 28, flared bottom end 18 includes raffinate port 30 through which the purified composition, i.e., the "raffinate" resulting from the extraction, is withdrawn by pump 34. Because the purified adhesive typically will be a high viscosity, high solids content admixture, pump 34 preferably is of a type, e.g., a screw pump, capable of handling such materials. Raffinate port 30 is directly attached to pump 34 that is turned on when mass 40 of polymer has formed. Raffinate line 32 is fitted with valve 36 so that raffinate line 32 may be controllably opened and closed.

Advantageously, flared bottom end 18 provides enlarged chamber 38 for collecting mass 40 made of fibers 19 that have agglomerated in enlarged chamber 38 below solvent port 28. During steady state operations, after mass 40 is established, portions of mass 40 may be withdrawn through raffinate line 32 at substantially the same rate at which additional portions of fibers 19 collect on the top of mass 40. Mass 40 is desirable in that it helps prevent an excessive amount of extraction solvent from flowing through raffinate port 30. In the absence of enlarged chamber 38, e.g., if the walls of column 12 were straight rather than flared at the bottom, mass 40 would be more difficult to maintain for economical, steady state operations. As a consequence, column 12 would have a tendency to plug, particularly when composition 11 is tacky.

Flared bottom end 18, therefore, should have a large enough cross-section and sufficient length to allow mass 40 to form without fibers 19 collecting up above in middle section 14, where collecting fibers 19 would have a tendency to agglomerate and eventually plug column 12. Preferably, therefore, the ratio of the maximum diameter of flared bottom end 18 to the diameter of middle section 14 is in the range from about 1.3 to 5, preferably about 2, and the length of the flared bottom should be greater than about 30 cm and is preferably about 120 cm.

The materials of construction for those parts of apparatus 10 that contact the process streams should be materials that are not corroded by the process streams and do not contain extractable or soluble impurities that would adversely affect the raffinate. The various components of extraction column 12 may be formed from any of a wide variety of materials that meet these criteria, including glass, ceramics, polymers, metallic compositions, combinations of these and the like. When feed composition 11 is tacky, it is highly desirable that the surfaces of apparatus 10 which contact feed composition 11 are formed from, or are coated with, a material such as polytetrafluoroethylene (available under the trade designation TEFLON from E.I. DuPont de Nemours and Co.), ultrahigh molecular weight polyethylene, or the like in order to reduce the tendency of composition 11 to stick to such surfaces. For example, in one embodiment, middle section 14 may be formed from a steel tube having an inside surface coated with polytetrafluoroethylene.

Apparatus 10 further includes extraction solvent supply system 42 for managing the flow of extraction solvent through column 12. According to one mode of operation, extraction solvent supply system 42 allows extraction solvent to be pumped into the top of column 12 and withdrawn from the bottom. In another mode of operation, extraction solvent supply system allows extraction solvent to be pumped into the bottom of column 12 and withdrawn from the top. Advantageously, as will be described below with respect to start-up operations involving tacky compositions, this dual mode capability allows an initial co-current flow of fibers 19 and extraction solvent to be established after which the flow of extraction solvent can be reversed to provide a counter-current flow.

Referring to the components of extraction solvent supply system 42 in more detail, the extraction solvent is supplied from a suitable source (not shown) through extraction solvent supply line 44. Extraction solvent supply line 44 is coupled to bottom solvent conduit 46 and by-pass tube 48 by valve 50. Bottom solvent tube 46, in turn, is coupled to bottom solvent port 28 for delivering extraction solvent into, or receiving extraction solvent from, the bottom flared end 18 through solvent port 28. Tube 46 is further coupled to drain line 52 fitted with drain valve 54. From drain line 52, the extraction solvent can be recycled, discarded, or the like, as desired. Near the top end of column 12, top solvent tube 56 is coupled to top solvent port 26 for delivering extraction solvent into, or receiving extraction solvent from, the top flared end 16 through solvent port 26. Top solvent tube 56 is coupled to by-pass tube 48 and top discharge line 58 by valve 60. From top discharge line 58, the extraction solvent can be recycled, discarded, or the like, as desired.

In order to establish a flow of extraction solvent such that the solvent flows into the top end of column 12 and is withdrawn from the bottom, valves 50, 54, and 60 may be set so that the extraction solvent flows through apparatus 10 in the directions shown by arrows 61A. On the other hand, in order to establish a flow of extraction solvent such that the solvent flows into the bottom end of column 12 and is withdrawn from the top, valves 50, 54, and 60 may be set so that the extraction solvent flows through apparatus 10 in the directions shown by arrows 61B.

The spinnerette assembly 20 is preferably placed in the extraction column 10 such that the apertures in the spinnerette assembly 20 are centered with respect to the axial position of column 14. For a polymer composition, especially a tacky polymer composition such as a PSA, the outermost apertures of the spinnerette assembly 20 must be a sufficient distance from the wall of the middle section 14 in order to prevent the polymer composition strands from becoming caught on the wall during operation and eventually plugging middle section 14. This distance is dependent upon the properties of the polymer composition and the construction material of middle section 14. Typically, the radius of a cylindrical glass extraction column should be at least approximately 8 mm greater than the circle in which the apertures 77 of the spinnerette assembly 20 are contained. If the apertures 77 are too far from the walls of the column, however, inefficient use of the extraction column is a result. Tacky compositions require a larger minimum space between the inner diameter of the column and the nearest strand of polymer composition to avoid sticking of the composition to the column walls. Low cohesive strength compositions that are not tacky permit a smaller minimum space to prevent plugging of the column.

Figure 2:
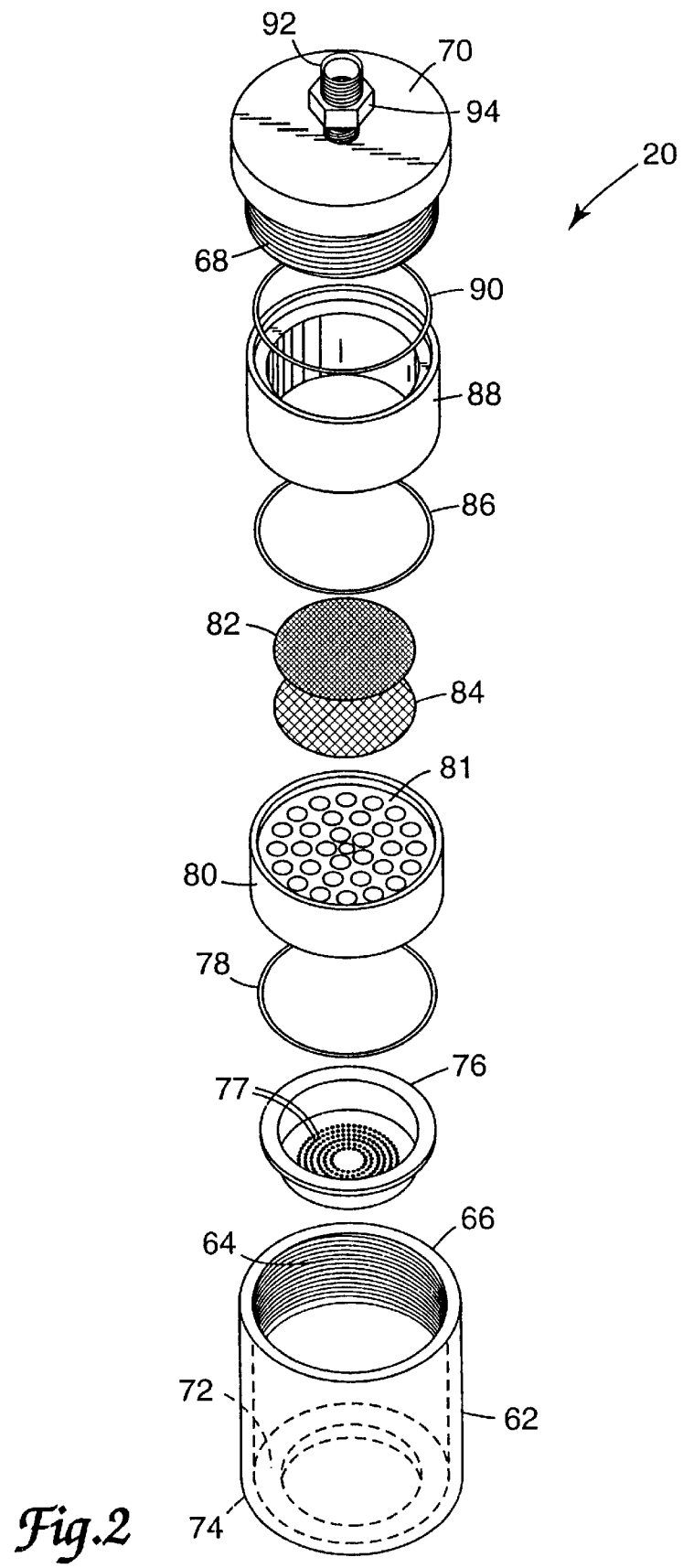
FIG. 2 is an exploded perspective view of a spinnerette assembly used in the apparatus of FIG. 1.

The component parts of spinnerette assembly 20 are shown in more detail in FIG. 2. Spinnerette assembly 20 includes housing 62 having threads 64 at top end 66 for threadably engaging corresponding threads 68 on cover 70. Housing 62 includes flange 72 at bottom end 74 for supporting spinnerette die cup 76. Spinnerette die cup 76 includes a plurality of apertures 77 through which the polymer feed from tube 22 is extruded to form fibers 19. Generally, a spinnerette having only a single aperture 77 could be used if desired, although use of a plurality of apertures 77 is more preferred in order to provide an extrudate with a high surface area to unit volume ratio so as to greatly reduce the diffusion path required for extraction.

Apertures 77 may have a wide range of sizes and shapes so long as the polymer composition feed stream is extruded into a form (cross-section) having (1) a sufficiently large ratio of surface area to unit volume for satisfactory mass transfer characteristics and (2) a sufficient polymer flow rate and an extraction solvent flow rate to reach the desired degree of extraction. Altering the size of the extruded polymer forms changes the distance of mass transfer of impurities out of the polymer and into the solvent. Smaller apertures 77 in the spinnerette die cup 76 tend to provide a greater efficiency of extraction. In preferred embodiments, apertures 77 are generally circular in shape and are as small as possible without being so small that polymer becomes entrained in the extraction solvent under otherwise desirable extraction conditions. The diameter of the round apertures 77 preferably should be less than 2.5 mm, preferably between 0.025 mm and 0.154 mm. Apertures 77 that are in the form of slits, stars, etc., should also create surface area/unit volume that is comparable to those created by round apertures. One specific embodiment of spinnerette die cup 76 found to be suitable in the practice or the present invention is commercially available from Nissho Iwai American Corporation.

Filter base 80 fits inside housing 62 and includes perforated supporting surface 81 for supporting filter 82 and filter support 84. O-ring 78 helps provide a liquid tight seal at the interface of filter base 80 and spinnerette die cup 76. Filter 82 prevents plugging of apertures 77 and should be able to remove particles and agglomerates having an effective particle size of at least 50% of the diameter of apertures 77, preferably at least 30%. Spacer ring 88 is placed inside housing 62 to ensure that the components of spinnerette assembly 20 are firmly seated together when cover 70 is threadably secured to housing 62. O-rings 90 and 86 provide a liquid tight seal at the interfaces between spacer ring 88 and the adjacent cover 70 and filter base 80, respectively. Cover 80 is fitted with nozzle 92 through which the adhesive polymer composition feed stream is pumped into spinnerette assembly 20. Nozzle 92 includes nozzle threads to facilitate threadable engagement with a corresponding coupling member at the end of feed supply conduit 22 (see FIG. 1).

Referring now collectively to FIGS. 1 and 2, one preferred mode of operating apparatus 10 in accordance with the present invention to purify a tacky polymer solution involves a first, co-current start-up phase to establish the flow of fibers 19 through column 12 and a second, counter-current, steady state extraction phase. The co-current start-up phase is useful to avoid column plugging. Column plugging is a problem avoided by the present invention, but otherwise commonly associated with extraction of tacky materials. This method of start-up is most preferred when the polymer composition is tacky and sufficiently cohesive as to allow fiber strands 19 to extend along the entire length of column 12. The co-current start-up phase is less beneficial if the polymer composition has low cohesive strength (being unable to stay together in the form of long, extruded fibers 19).

According to the start-up phase, valves 50, 54, and 60 are set so that column 12 is filled with enough extraction solvent to wet outlet face 24 of spinnerette assembly 22. Column 12 can be filled with extraction solvent either through top solvent port 26 or bottom solvent port 28, as desired. After column 12 is filled, valves 50, 54, and 60 may be set so that a flow of extraction solvent can be established through column 12 from the top to the bottom as represented by arrows 61A. Feed composition 11 is then extruded directly into the extraction solvent through spinnerette assembly 20 whose outlet face is submerged in the extraction solvent. As feed composition 11 is extruded through the plurality of apertures 77 into the extraction solvent, the feed composition 11 is subdivided into a corresponding plurality of discrete extrudate strands. The extrudate strands precipitate in the extraction solvent (mainly because the extraction solvent is selected to be as immiscible with the polymer component of composition 11 as is practically possible and miscible with any solvent component of composition 11), and the co-current flow of extraction solvent also helps to direct the precipitating extrudate strands toward the bottom of column 12. Additionally, the higher density of the extrudate strands also helps to cause the extrudate to move downward through the lower density solvent in column 12. As a result, the extrudate strands are formed into fibers 19.

At least in this start-up phase, the extraction solvent is caused initially to flow co-currently with the extrudate strands and then with fibers 19 as these are formed. The term "co-current flow" means that the bulk flows of extraction solvent and fibers 19 through column 12 is in the same direction. This initial precipitative, co-current flow is an advantageous, preferred feature of the invention that allows fibers 19 to reach the flared end 18 with minimal start-up difficulty. The co-current flow rate of the extraction solvent serves to assist the extension of fibers 19 along the entire length of middle section 14 of column 12. Thus, the flow rate of the extraction solvent can vary from no flow to flow in the turbulent regime as long as the fibers 19 are able to individually form and exist along the entire length of section 14 without agglomeration. In general, however, if the flow rate of the extraction solvent is too slow during the start-up phase, the tacky fibers 19 may sway back and forth enough to stick together and/or get caught on walls of the column 12, eventually plugging column 12. On the other hand, if the flow rate of the extraction solvent is too fast during the start up phase relative to the flow rate of the polymer composition feed, solvent is being wasted and turbulence, if any, may push fibers 19 together, causing fibers 19 to agglomerate and possibly plug column 12. With these concerns in mind, a typical linear flow rate of extraction solvent during the start-up phase is from 15 cm/min to 60 cm/min.

Once fibers 19 are adequately established, the co-current flow of solvent is gradually decreased to zero. Then, a counter-current flow of the solvent is gradually established upward through column 12 as represented by arrows 61B to a predetermined flow rate that would establish the proper counter-current flow ratio of extraction solvent to feed composition 11 for obtaining desired levels of purity in the raffinate. Fibers 19 continue to fall through column 12 even after such counter-current flow is established. Mass 40 is allowed to form in flared end 18, after which extraction operations may be carried out in a steady state operation by keeping the top of mass 40 below solvent inlet port 28 at the bottom of column 12 as portions of the raffinate are withdrawn. Once this counter-current flow is established and mass 40 is formed, the start-up phase is complete and the steady state extraction phase is underway.

The relative mass flow rates of extraction solvent and feed composition 11 helps determine the number of theoretical extraction stages required to achieve a desired degree of purification. Generally, using a higher mass flow rate of extraction solvent relative to that of the feed flow rate reduces the number of theoretical extraction stages required to carry out the extraction. Choosing an appropriate ratio of the solvent mass flow rate to that of the feed depends largely on the partition coefficient of the impurities being removed and the length of extraction column 12. Using too low a mass flow ratio results in insufficient extraction, and using too high a mass flow ratio results in inefficient use of the extraction solvent (i.e., prohibitive solvent recovery costs). Balancing these concerns, the mass flow ratio of extraction solvent to feed composition 11 is in the range from 0.2 to 20, preferably 2 to 5.

The flow velocities of the extraction solvent and the feed composition 11 need to be sufficiently high during steady state extraction to minimize adverse axial mixing of either phase during extraction. Axial mixing reduces the efficiency of counter-current extraction. The linear velocity of the extraction solvent through column 12 depends on both the volumetric flow rate of the solvent and the diameter of the column. For a desired mass flow ratio of extraction solvent to feed composition 11, the extraction solvent velocity should be sufficiently high to minimize axial mixing or dispersion of the solvent phase, but not too high so as to cause entrainment or significant entanglement of fibers 19. Typically, the linear velocity of the extraction solvent in column 12 is in the range from approximately 5 cm/min to 40 cm/min, preferably 10 cm/min.

It is also possible for the velocity of solvent to be pulsed during operation of column 12. The pulsing should not be so severe, however, so as to cause agglomeration of fibers 19 or flooding of column 12.

The linear velocity of fibers 19 through column 12 should be chosen so that efficient extraction of impurities occurs. The linear velocity of the polymer composition is largely dependent upon the density difference between fibers 19 and the extraction solvent, the linear velocity of the solvent flow, number of distinct fiber strands, and the diameter of the fiber strands. Typically, the linear velocity of fibers 19 composition is in the range from 120 cm/min to 360 cm/min.

The temperature at which steady state extraction occurs is selected to result in effective, efficient extraction of the impurities of interest. Hence, the temperature should be chosen to result in acceptable partition coefficients, sufficiently high mass transfer coefficients, and sufficient surface area/unit volume of the dispersed polymer phase. As a point of caution, the temperature at which the extraction is carried out should not be so high so as to be above the lowest boiling point of any material being processed. Generally, extraction temperatures may range from −30° C. to just below the boiling point of the extraction solvent. More preferably, the extraction temperature may range from 10° C. up to 10° C. below the boiling point of the extraction solvent.

The invention will be further described by the following examples. All parts, ratios, and percentages are expressed in terms of weight, unless otherwise expressly noted. The following test methods were used to characterize samples:

Impurity Concentration

The concentrations of two different residual monomer impurities, isooctyl acrylate (IOA) and acrylamide (ACM), were determined separately by use of a Hewlett-Packard Model 5890 or Model 6890 gas chromatograph with a flame ionization detector and autosampler. An internal standard was specifically selected based on the impurity being measured. The internal standard for the determination of residual IOA monomer impurity and ACM monomer impurity were tetradecane and decanol, respectively. Approximately 150 mg of adhesive was solubilized in 10 ml of 90/10 ethyl acetate/methanol solvent, precipitated with 10 ml of one of the aforementioned internal standard solutions in methanol and centrifuged to yield a clear extract sample. The extract was injected into the gas chromatograph for analysis. The specific configuration and conditions used for each impurity were as follows:

A. IOA analysis

NOTE: Since IOA is a mixture of isomers, its chromatogram includes a group of peaks rather than one single peak. In addition, isooctyl alcohol impurity concentration was also included with the IOA levels that were reported.

1. Column: 15 m×0.53 mm ID; J&W Scientific Durabond DB-5, 1.5 micrometer film thickness.

2. Gas Flows:

Carrier: Helium at approximately 12 mL/min.

Septum purge flow: 5 mL/min.

Split vent purge flow: 50 mL/min.

Auxiliary make-up flow: 13 mL/min.

3. Detector: Flame Ionization (FID) at 300° C.

4. Oven Temperature:

Initial temperature: 90° C., hold 1.0 min.

Program rate 1: 4° C. per min.

Final temperature 1: 115° C., hold 4.0 min.

Program rate 2: 30° C. per min.

Final temperature 2: 250° C., hold 2 min.

5. Injector temperature: 250° C.

6. Injection Volume: 2 μL.

7. Run time table:

Split vent purge flow off—initial

Split vent purge flow on at 0.35 min.

Split vent purge flow off at 17.5 min.

B. ACM analysis

1. Column: 15 meter×0.53 mm ID; J&W Scientific Durabond DB-WAX, 1.0 micrometer film thickness.

2. Gas Flows:

Carrier: Helium at approximately 14 mL/min

Septum purge flow: 5 mL/min

Split vent purge flow: 40 mL/min.

3. Detector temperature: FID at 300° C.

4. Oven Temperature:

Initial temperature: 90° C., hold to 4.0 min.

Program rate 1: 8° C. per min.

Final temperature 1: 140° C., hold 2.0 min.

Program rate 2: 30° C. per min.

Final temperature 2: 220° C., hold 5 min.

5. Injector temperature: 250° C.

6. Injection volume: 3 μL.

7. Run time table:

Split vent purge flow off—initial

Split vent purge flow on at 0.35 min.

Split vent purge flow off at 19.8 min.

Internal standards of the residual monomer impurity (e.g., isooctyl acrylate and isooctyl alcohol, or acrylamide) to be detected are made up in volumetric flasks. The concentrations of monomer being tested are selected to bracket the range of unreacted monomer expected in the adhesive samples obtained from the extraction experiments so that the measurement error is less than +/−5%. Because impurity levels in the original adhesives were measured with the same internal standards and not ones that bracketed the higher levels expected in the input material, those values have a measurement error of up to +/−20%. Residual monomer impurity concentration for each impurity was reported as parts by weight per million parts by weight of dry pressure-sensitive adhesive Inherent Viscosity (IV)

The IV of each sample of PSA raffinate was measured to provide a determination of whether the process adversely affected the molecular weight of the PSA. An IV range of from 1.25 to 1.5 was satisfactory for some applications. The IV was measured by conventional means using a Cannon-Fenske No. 50 Viscometer in a water bath controlled at 25° C. to measure the flow time of 10 milliliters (mL) of a polymer solution (0.15 g/dL of polymer in ethyl acetate solvent) and the flow time of the solvent and calculating the IV of the polymer.

Percent Solids

The concentration of the solids in the raffinate was determined by first placing about 1 gram (g) of the raffinate in a pre-weighed aluminum tin and heating the tin in an air circulating oven for 60 minutes (min) that had been set at 105° C. The sample was then weighed again and the percent solids was calculated and reported in weight percent.

EXAMPLE 1

The effect of the process of the invention on the concentrations of two residual monomer impurities in a pressure-sensitive adhesive solution was illustrated using an apparatus configured in accordance with apparatus 10 of FIG. 1.

During startup, extraction solvent (methanol, 99.85% minimum purity available from Ashland Chemical Co.) was pumped into the extraction column with a peristaltic pump. The middle section of the extraction column was positioned vertically, made of boro-silicate glass and had a height of 4.9 m (16 ft), an outside diameter of 47 mm (1.85 in) and an inside diameter of 38 mm (1.5 in). Each end of the middle section was coupled to flared glass members having an internal diameter expanded to 76 mm (3 in). Once the column was filled, extraction solvent continued to be fed into the extraction column through a port that was located above the spinnerette assembly and removed through a port that was located near the bottom of the column. The flow rate of the extraction solvent was approximately 400 g/min. The feed was a PSA solution comprising a pressure sensitive copolymer of iso-octyl acrylate and acrylamide in a weight ratio of 93:7. The copolymer was dissolved in a feed solvent containing a 90:10 weight ratio of ethyl acetate and methanol at a solids content of between 25 and 30%. The copolymer was solution polymerized as in Example 6 of U.S. Pat. No. 4,751,087. The feed was pressure fed with an inert gas (nitrogen) at 200 KPa to a gear metering pump and metered through a membrane pre-filter (80×700 mesh stainless steel twill Dutch weave available from The Murdock Co.) into the spinnerette assembly. The spinnerette assembly contained an additional membrane filter (165×1400 mesh stainless steel twill Dutch weave available from The Murdock Co.) and a spinnerette die cup (available from Nissho Iwai American Corporation). The spinnerette die cup had 140 orifices, each with a diameter of 0.076 mm, equally spaced from each other within each ring of orifices and centrally arranged in 5 concentric rings around the axis of the spinnerette die cup. The orifices were confined to a circular region having an outside diameter of approximately 23 mm. The spinnerette assembly was fit into the top widened portion of the extraction column such that the bottom face of the spinnerette die cup was wetted by the extraction solvent in the column. The PSA solution was extruded through the spinnerette die cup at a rate of 26.3 g/min into the extractant filled extraction column to form fibers of adhesive solution. The PSA fibers fell from the top of the column to the bottom of the column in the same direction as the extraction solvent (i.e., co-currently). Approximately 0.9 m (3 ft) from the top of the extraction column, the PSA strands precipitated from solution, becoming white fibers containing a higher solids content of PSA as compared to the feed adhesive solution. When the precipitated fibers reached the expanded bottom of the column, the co-current flow of extraction solvent was stopped, and then gradually reversed and increased to achieve counter-current flow between the extraction solvent and the PSA fibers.

The counter-current flow rate of the extraction solvent was 104 g/min to result in a weight ratio of extraction solvent to feed mass flow rates of about 4:1. The fibers of precipitated, higher solids, PSA were collected at the bottom of the column and a mixture of ethyl acetate, methanol and residual monomer impurities were removed from the top of the column as extract. The larger cross-section at the bottom end of the column 38 enabled the precipitated adhesive to form a mass 40 in this expanded section of the column without plugging the middle section 14 (i.e., 38 mm ID) of the column. In addition, this mass in the expanded section of the column prevented extraction solvent from freely exiting the column out the bottom when the raffinate of high solids precipitated PSA was withdrawn. Once the mass was formed, its size was maintained by the continuous removal of the precipitated PSA as raffinate from the column with a K-tron screw pump that was coupled to raffinate port 30. A flexible stainless steel bellows tube 32 was incorporated between the K-tron screw pump and the glass column in order to reduce stresses associated with coupling the glass column to the screw pump. Samples of raffinate and extract were taken at different times during the extraction.

The IOA and ACM residual monomer impurity concentrations for the feed PSA solution and the various samples of raffinate and extract, together with the IV and solids concentration of the feed PSA and the raffinate samples were measured or calculated. The concentrations of residual IOA and ACM in the feed PSA solution were 17,581 and 7,249 ppm, respectively. The concentrations of residual IOA and ACM in the raffinate PSA solution ranged from 44 to 75 ppm and from 6 to 11 ppm, respectively. Thus, the average concentration of the IOA and ACM residual monomer impurities in the raffinate were reduced by a factor of about 295 and 850, respectively. The concentrations of residual IOA and ACM in the extract ranged from 778 to 894 µg/ml and from 325 to 385 µg/ml, respectively. The PSA in the feed had an IV of 1.40 and the PSA in the raffinate had an IV that ranged from 1.38 to 1.44 and a calculated average percent solids of 69 weight %.

EXAMPLE 2

The effect of decreasing the amount of extraction solvent relative to the feed ratio upon the extraction performance of the process was illustrated. Example 2 was conducted in accordance with the procedure of Example 1 except the flow rate of the extraction solvent was reduced to 77 from 104 g/min to result in a ratio of extractant to feed mass flow rates of 2.9:1 instead of about 4:1.

The IOA and ACM residual monomer impurity concentrations for the feed PSA solution and the various samples of raffinate and extract, together with the IV of the raffinate samples were measured. The concentrations of residual IOA and ACM in the feed PSA solution were 17,556 and 6,878 ppm, respectively. The concentrations of residual IOA and ACM in the raffinate PSA solution ranged from 99 to 162 ppm and from 17 to 22 ppm, respectively. Thus, the average concentration of the IOA and ACM residual monomer impurity in the raffinate were reduced by a factor of about 135 and 350, respectively. The concentrations of residual IOA and acrylamide in the extract ranged from 1072 to 1159 µg/ml and from 429 to 494 µg/ml, respectively. The PSA in the feed had an IV of 1.43 and the PSA in the raffinate had an IV that ranged from 1.40 to 1.42.

EXAMPLE 3

The effect of decreasing the length of the extraction column, and thus the number of theoretical extraction stages, upon the extraction performance of the process was shown. This experiment was conducted in accordance with the procedures of Example 1 except some process equipment and conditions were changed. Specifically, the length of middle section 14 was reduced to 1.5 m (5 ft) from 4.9 m (16 ft). The extraction solvent was fed into the column from a pressure feed tank, and the flow was regulated with a needle valve to approximately 122 g/min. The PSA solution feed stock was fed at a rate of 31.5 g/min to result in a 4:1 ratio of extraction solvent to feed mass flow rates. The raffinate was allowed to slowly flow from the enlarged bottom section of the column 38 by intermittently opening and closing a 38 mm (1.5 in) ball valve once the plug 40 was formed instead of being removed continuously with a screw pump.

The IOA and ACM residual monomer impurity concentrations for the feed PSA solution and the various samples of raffinate and extract, together with the IV of the feed and raffinate samples, were measured. The concentrations of residual IOA and ACM in the feed PSA solution were 29,146 and 1,993 ppm, respectively. The concentrations of residual IOA and ACM in the raffinate PSA solution ranged from 1,775 to 2,062 ppm and from 43 to 50 ppm, respectively. Thus, the average concentration of the IOA and ACM residual monomer impurity in the raffinate were reduced by a factor of about 15 and 40, respectively. The concentrations of residual IOA and acrylamide in the extract ranged from 1,333 to 1,479 µg/ml and from 100 to 107 µg/ml, respectively. The PSA in the feed had an IV of 1.41 and the PSA in the raffinate had an IV that ranged from 1.40 to 1.45.

EXAMPLE 4

This example illustrates the effect of fiber diameter, and thus interfacial surface area, upon the extraction performance of the process. This experiment was conducted in accordance with the procedures of Example 1 using the shorter column of Example 3, except some process equipment and conditions were changed. Specifically, the spinnerette die had 140 orifices that all had a diameter of 0.127 mm. The extraction solvent was fed into the column at a flow rate of 182 g/min and the PSA solution feed stock was fed through the spinnerette die at a rate of 47.3 g/min to result in a 4:1 ratio of extraction solvent to feed mass flow rates.

The IOA and ACM residual monomer impurity concentrations for the feed PSA solution and the various samples of raffinate and extract, together with the IV of the feed and raffinate samples, were measured. The concentrations of residual IOA and ACM in the feed PSA solution were 26,978 and 1,906 ppm, respectively. The concentrations of residual IOA and ACM in the raffinate PSA solution ranged from 2,479 to 2,738 ppm and from 55 to 75 ppm, respectively. Thus, the average concentration of the IOA and ACM residual monomer impurity in the raffinate were reduced by a factor of about 10 and 29, respectively. The concentrations of residual IOA and acrylamide in the extract ranged from 1,214 to 1,491 µg/ml and from 89 to 104 µg/ml, respectively. The PSA in the feed had an IV of 1.48 and the PSA in the raffinate had an IV that ranged from 1.39 to 1.44.

EXAMPLE 5

This example shows the effect of the extraction performance of the process upon a different PSA solution. This experiment was conducted in accordance with the procedure of Example 1 except that the PSA solution and process equipment were different and some process conditions were changed. The feed was a PSA solution comprising a copolymer of iso-octyl acrylate/acrylamide/vinyl acetate in a weight ratio of 75:5:20 in a feed solvent comprising 90:10 weight ratio of ethyl acetate and methanol with a solids content of between 25 and 30%. The copolymer was solution polymerized as in Example 16 of U.S. Pat. No. 4,737,577. The spinnerette die cup was similar to that of Example 4 except apertures were absent from a region about 5.3 mm in width extending radially through all of the aperture rings, eliminating 10 apertures. The extraction solvent was fed into the column at a flow rate of 90 g/min and the PSA solution feed stock was fed at a rate of 31.5 g/min to result in a ratio of extraction solvent to feed mass flow rates of about 2.9:1.

The IOA and ACM residual monomer impurity concentrations for the feed PSA solution and the various samples of raffinate and extract were measured. The concentrations of residual IOA and ACM in the feed PSA solution were 1,533 and 272 ppm, respectively. The concentrations of residual IOA and ACM in the raffinate PSA solution was less than 42 ppm and less than 6 ppm, respectively. Thus, the average concentration of the IOA and ACM residual monomer impurity in the raffinate were reduced by a factor of at least 35 and 45, respectively. The concentrations of residual IOA and acrylamide in the extract ranged from 53 to 125 µg/ml and from 19 to 29 µg/ml, respectively.

EXAMPLE 6

Prophetic Example

This example would show the effect of the extraction performance of the process upon still another acrylate PSA solution.

A PSA solution was formed by solution polymerization as in Example 1 of U.S. Pat. No. Re. 24,906. The resultant solution comprised a copolymer of 2-ethylhexyl acrylate/ acrylic acid (EHA/AA) in a weight ratio of 98:2 in a solvent comprising 45:55 weight ratio of ethyl acetate and heptane at a solids content of between 25 and 30%. A mixture of 49 parts of PSA solution and 95 parts of methanol was observed to form two phases with a precipitated polymer phase below a clear liquid phase. The precipitated polymer was judged sufficiently strong to form strands in the extraction process described in Example 1. Thus the following description would be expected.

An experiment would be conducted following the procedures of Example 1 except the PSA solution of this example would be used as the feed. The EHA and AA residual monomer impurity concentrations for the feed PSA solution and the various samples of raffinate and extract would be measured. Analyses of samples taken from both the raffinate and extract streams would indicate that significant removal of residual 2-ethyhexyl acrylate and acrylic acid from the feed adhesive would have occurred during the extraction process.

EXAMPLE 7

The effect of shape of the spinnerette orifices upon the extraction performance of the process is illustrated. Example 7 was like in Example 1 run with the PSA solution of Example 5 except some process equipment and conditions were changed. The spinnerette die had 18 orifices shaped like slits having a length of 3.1 mm and a width of 0.05 mm, equally spaced within each ring, radially oriented from the axis of the cylindrical spinnerette die cup and confined within a circular area of about 300 mm$^2$. The extraction solvent was fed into the column at a flow rate of 104 g/min and the PSA solution feed stock was metered through the spinnerette die at a rate of 28.7 g/min to result in a ratio of extraction solvent to feed mass flow rates of 3.6:1. During the experiment, the PSA solution fell through the column in the form of ribbons.

The IOA and ACM residual monomer impurity concentrations for the feed PSA solution and the various samples of raffinate and extract were measured. The concentrations of residual IOA and ACM in the feed PSA solution were 1,963 and 261 ppm, respectively. The concentrations of residual IOA and ACM in the raffinate PSA solution was less than 42 ppm and less than 6 ppm, respectively. Thus, the average concentration of the IOA and ACM residual monomer impurity in the raffinate were reduced by a factor of at least 47 and 44, respectively. The concentrations of residual IOA and acrylamide in the extract ranged from 38 to 56 μg/ml and from 10 to 20 μg/ml, respectively.

EXAMPLE 8

Prophetic Example

This example would show that impurities can be removed from non-tacky polymer systems.

A feed solution was made by dissolving a non-tacky polymer (a partially hydrogenated base resin polymerized using styrenic-based comonomers and available as REGAL-REZ™ 1139 from Hercules Chemical Co.) into toluene. The non-volatiles concentration was 70 weight percent and the solution viscosity was estimated to be approximately 20,000 cp at 25° C. The feed solution was extruded through a spinnerette die cup containing 40 holes all having a diameter of 130 micrometers each (5 mil), and into a quantity of methanol in contact with the bottom face of the spinnerette die. The polymer precipitated from solution to form fibers of a very flaky consistency. Thus the following description would be expected.

This experiment would be conducted in a manner similar to Example 1 except the feed solution would be the polymer solution of this example and some process conditions such as flow rates would be changed. Specifically, the extraction solvent and the non-tacky polymer solution would be fed into the column at flow rates resulting in a ratio of extraction solvent to feed to yield a satisfactory extraction of target impurities with economical use of solvent.

The impurity concentrations for the feed solution and the various samples of raffinate and extract would be measured. Analyses of samples taken from both the raffinate and extract streams would indicate that significant removal of residual undesirable impurity from the feed styrenic polymer had occurred during the extraction process.

EXAMPLE 9

Prophetic Example

This example would illustrate that other extractants can be used in the extraction process to remove impurities from PSA solutions.

54 parts of a PSA solution similar to that used in Example 1 was vigorously mixed with an extraction solvent, 105 parts of acetonitrile, and observed to form a two phase mixture in which the adhesive precipitated. The precipitated PSA was judged sufficiently strong to form strands in the extraction process described in Example 1. Thus the following description would be expected.

This experiment would be conducted in a manner similar to Example 1 except acetonitrile would be used as the extraction solvent. The extraction solvent and the PSA solution would be fed into the column at flow rates such that the ratio of extraction solvent to feed mass flow rates is about 4:1.

The IOA and ACM residual monomer impurity concentrations for the feed PSA solution and the various samples of raffinate and extract would be measured. Analyses of samples taken from both the raffinate and extract streams would indicate that significant removal of both the residual IOA monomer impurity and the residual ACM monomer impurity from the feed adhesive had occurred during the extraction process.

Other embodiments of this invention will be apparent to those skilled in the art upon consideration of this specification or from practice of the invention disclosed herein. Various omissions, modifications, and changes to the principles and embodiments described herein may be made by one skilled in the art without departing from the true scope and spirit of the invention which is indicated by the following claims.

What is claimed is:

1. A method for removing at least one impurity from a tacky polymer composition, comprising:
    (a) extruding said polymer composition into an extraction solvent; and
    (b) contacting the polymer composition with the extraction solvent under conditions such that at least a portion of the impurity is extracted from the polymer composition into the extraction solvent.

2. The method of claim 1, wherein step (b) further comprises causing at least a portion of the polymer composition to precipitate while contacting the extraction solvent.

3. The method of claim 1 wherein the polymer composition and the extraction solvent flow counter-currently relative to each other.

4. The method of claim 1 in which the tacky polymer composition is characterized as one which cannot be spun.

5. The method of claim 1, wherein step (a) comprises extruding the polymer composition directly into the extraction solvent through a plurality of apertures.

6. The method of claim 1, wherein the extruded polymer composition comprises a plurality of fibers, and step (b) comprises contacting the fibers with the extraction solvent.

7. The method of claim 1, wherein step (a) comprises extruding the polymer composition into a first portion of an extraction vessel through a plurality of orifices, said vessel having an enlarged second end and a raffinate opening proximal to said second end, and said method further comprising the steps of causing the polymer composition to flow through the extraction vessel from the first portion to the enlarged second end and allowing a mass of the polymer composition to form in the enlarged second end.

8. The method of claim 7, wherein the extraction solvent flows counter-current to the polymer composition in the extraction vessel and the solvent enters the extraction vessel in the enlarged second end unobstructed by the mass of polymer formed in the enlarged second end.

9. The method of claim 7, wherein:

the extraction vessel comprises a straight, unobstructed middle section; and during step (b) the polymer composition is subdivided into a plurality of extruded forms that move in unimpeded fashion through said middle section.

10. The method of claim 1, wherein:

the polymer composition is a solution that comprises a tacky polymer component and a feed solvent; and wherein the extraction solvent is substantially immiscible with the polymer component but at least partially miscible with the feed solvent.

11. The method of claim 10, wherein the density of the polymer component is greater than the density of the extraction solvent.

12. The method of claim 2, wherein the tacky polymer composition comprises a pressure sensitive adhesive.

13. A method of removing impurities from a tacky, polymer composition comprising a polymer component and at least one impurity, comprising:

(a) causing an extraction solvent that is substantially immiscible with the polymer component to flow through a vertical extraction column from a first end of the column to a second end of the extraction column;

(b) extruding a polymer composition into the extraction solvent through a plurality of orifices proximal to the first end of the extraction column;

(c) causing the extruded polymer composition to form a plurality of fibers that extend along a length of the column from the orifices to the second end, said fibers flowing co-currently with the flow of extraction solvent;

(d) after the fibers form, causing the extraction solvent to enter the extraction column through a solvent port at the second end of the column and flow counter-currently to the fibers; and (e) contacting the counter-current masses of the fibers and the extraction solvent under conditions such that at least a portion of the impurity is extracted from the polymer composition into the extraction solvent.

14. The method of claim 13, wherein the second end of the vertical extraction column comprises an enlarged portion and includes a raffinate opening located upstream of the solvent entry port, and wherein the method further comprises the step of allowing the flowing fibers to form a mass in the enlarged portion in the region near the raffinate port but upstream of the solvent entry port.

15. The method of claim 13, wherein the polymer composition is a solution that comprises a tacky polymer component and a feed solvent, wherein the extraction solvent is substantially immiscible with the polymer component but at least partially miscible with the feed solvent and further comprising the step of causing at least a portion of the polymer composition incorporated into the fibers to precipitate while the fibers flow counter-currently to the extraction solvent.

16. The method of claim 13, wherein the polymer component comprises a pressure-sensitive adhesive.

17. A method for removing at least one impurity from a low-cohesive strength polymer composition, comprising the steps of:

(a) extruding the polymer composition into an extraction solvent; and (b) contacting the polymer composition and the extraction solvent under conditions such that a phase change occurs in the polymer composition and at least a portion of the impurity is extracted from the polymer composition into the extraction solvent.

18. The method of claim 17, wherein the polymer composition is a solution that comprises a polymer component and a feed solvent, wherein the extraction solvent is substantially immiscible with the polymer component but at least partially miscible with the feed solvent.

* * * * *